(12) United States Patent
Childers et al.

(10) Patent No.: US 11,353,663 B2
(45) Date of Patent: *Jun. 7, 2022

(54) UNITARY MULTI-FIBER OPTICAL FERRULE WITH INTEGRATED LENSES

(71) Applicant: US Conec, Ltd., Hickory, NC (US)

(72) Inventors: Darrell R. Childers, Hickory, NC (US); Eric Childers, Hickory, NC (US)

(73) Assignee: US Conec, Ltd., Hickory, FL (US)

( * ) Notice: Subject to any disclaimer, the term of this patent is extended or adjusted under 35 U.S.C. 154(b) by 537 days.

This patent is subject to a terminal disclaimer.

(21) Appl. No.: 15/425,969

(22) Filed: Feb. 6, 2017

(65) Prior Publication Data

US 2017/0146748 A1 May 25, 2017

Related U.S. Application Data

(63) Continuation of application No. 12/907,644, filed on Oct. 19, 2010, now Pat. No. 9,563,027.

(51) Int. Cl.
| | |
|---|---|
| *G02B 6/38* | (2006.01) |
| *G02B 6/40* | (2006.01) |
| *G02B 6/44* | (2006.01) |

(52) U.S. Cl.
CPC .......... *G02B 6/3853* (2013.01); *G02B 6/382* (2013.01); *G02B 6/3831* (2013.01); *G02B 6/3839* (2013.01); *G02B 6/3861* (2013.01); *G02B 6/3882* (2013.01); *G02B 6/403* (2013.01); *G02B 6/4403* (2013.01); *G02B 6/3855* (2013.01)

(58) Field of Classification Search
CPC .... G02B 6/382; G02B 6/3853; G02B 6/3855; G02B 6/3882; G02B 6/403; G02B 6/4403
See application file for complete search history.

(56) References Cited

U.S. PATENT DOCUMENTS

| | | | | |
|---|---|---|---|---|
| 5,815,621 | A * | 9/1998 | Sakai | B24B 19/226 264/1.1 |
| 5,923,803 | A * | 7/1999 | Bunin | G02B 6/3885 385/77 |
| 6,012,852 | A * | 1/2000 | Kadar-Kallen | G02B 6/32 385/74 |
| 6,210,047 | B1 * | 4/2001 | Grois | G02B 6/3855 385/83 |
| 6,629,781 | B2 * | 10/2003 | Shigenaga | G02B 6/3839 385/59 |

(Continued)

FOREIGN PATENT DOCUMENTS

JP 2009258510 A * 11/2009 ............... G02B 6/40

OTHER PUBLICATIONS

Nishimura, Akita, English Translation for JP 2009-258510 A, 12 pages, Document Published in Nov. 2009 (Year: 2009).*

*Primary Examiner* — Daniel Petkovsek
(74) *Attorney, Agent, or Firm* — Michael L. Leetzow, P.A.; Shubhrangshu Sengupta

(57) ABSTRACT

A unitary multi-fiber ferrule has micro-holes for optical fibers, an optical stop plane for the optical fibers, and a plurality of lenses disposed adjacent the front end, each of the plurality of lenses optically aligned with one of the micro-holes and exposed to air. Multiple rows of optical fibers and lenses may also be used in the unitary multi-fiber ferrule. The unitary multi-fiber ferrule requires less processing and equipment than other current optical ferrules.

20 Claims, 7 Drawing Sheets

(56) References Cited

U.S. PATENT DOCUMENTS

| | | | | |
|---|---|---|---|---|
| 6,799,900 B2* | 10/2004 | Shiino | ............... | G02B 6/3833 |
| | | | | 385/14 |
| 7,108,431 B2* | 9/2006 | Yang | .................... | G02B 6/3833 |
| | | | | 385/114 |
| 7,503,703 B1* | 3/2009 | Thorson | ............... | G02B 6/3817 |
| | | | | 385/33 |
| 7,510,337 B2* | 3/2009 | Takeda | ................. | G02B 6/3861 |
| | | | | 385/65 |
| 7,985,026 B1* | 7/2011 | Lin | ......................... | G02B 6/32 |
| | | | | 385/55 |
| 8,292,515 B2* | 10/2012 | Liao | ....................... | G02B 6/322 |
| | | | | 385/52 |
| 8,434,949 B2* | 5/2013 | Wang | ...................... | G02B 6/32 |
| | | | | 385/53 |
| 9,063,304 B2* | 6/2015 | Ohta | .................... | G02B 6/4214 |
| 9,563,027 B2* | 2/2017 | Childers | .............. | G02B 6/3831 |
| 2002/0176670 A1* | 11/2002 | Shinoda | ............... | G02B 6/3839 |
| | | | | 385/80 |
| 2003/0174971 A1* | 9/2003 | Shigenaga | ........... | G02B 6/3834 |
| | | | | 385/71 |
| 2006/0245694 A1* | 11/2006 | Chen | ........................ | G02B 6/32 |
| | | | | 385/71 |
| 2009/0154884 A1* | 6/2009 | Chen | ........................ | G02B 6/32 |
| | | | | 385/79 |
| 2011/0091167 A1* | 4/2011 | Nishimura | ........... | G02B 6/4249 |
| | | | | 385/88 |

\* cited by examiner

UNITARY MULTI-FIBER OPTICAL FERRULE WITH INTEGRATED LENSES

BACKGROUND OF THE INVENTION

Field of the Invention

Typically, optical fibers inserted in optical ferrules, particularly MT ferrules, need a significant amount of processing for the optical ferrules to be able to efficiently transmit the light through the optical fibers and across a fiber optic junction. Optical fibers are inserted into the ferrules and then epoxy is injected into the ferrules to secure the fibers in the ferrules. The ferrules are then placed in curing oven for about 30 minutes to cure the epoxy. After the epoxy is cured, the ferrules are polished and cleaned at least four times using a fiber optic polishing machine. The visual quality of the optical fiber end face is examined and the ferrules are re-polished if there are significant scratches or pits. The end face geometry is also usually measured with an interferometer and re-polished if there are issues with the end face quality. Lastly, an optical test is completed. This process requires a significant capital outlay for the equipment as well as significant time and operator intervention to achieve a quality product.

While providing an excellent fiber optic connector, a cheaper optical ferrule that can be more efficiently assembled without the expensive equipment is needed.

SUMMARY OF THE INVENTION

The present invention is directed to a unitary multi-fiber optical ferrule that has rounded holes in the body of the ferrule to accept and guide the optical fibers and integrated lenses that can either collimate or focus the light for optical communication with another optical ferrule.

According to one aspect of the present invention, a unitary fiber optic ferrule is provided that includes a unitary main body having a front end, a back end, and a middle portion disposed between the front end and back end, a first opening adjacent the back end of the unitary main body, the first opening configured to receive at least two optical fibers, a plurality of optical fiber openings extending from the first opening toward the front end, each of the plurality of optical fiber openings configured to receive an optical fiber, an optical fiber stop plane disposed between the plurality of optical fiber openings and the front end, and a plurality of lenses disposed adjacent the front end, each of the plurality of lenses being in optical alignment with a respective one of the optical fiber openings, the plurality of lenses having at least one surface exposed to air.

In yet another aspect, a unitary fiber optic ferrule is provided that includes a unitary main body having a front end, a back end, and a middle portion disposed between the front end and back end, a first opening adjacent the back end of the unitary main body, the first opening configured to receive at least two optical fibers, a plurality of optical fiber openings extending from the first opening toward the front end, each of the plurality of optical fiber openings configured to receive an optical fiber, a plurality of lenses disposed adjacent the front end, each of the plurality of lenses being in optical alignment with a respective one of the optical fiber openings, the plurality of lenses having at least one surface exposed to air, and at least one fiber optic guide pin integrally formed with the unitary main body and extending outwardly from the front end.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
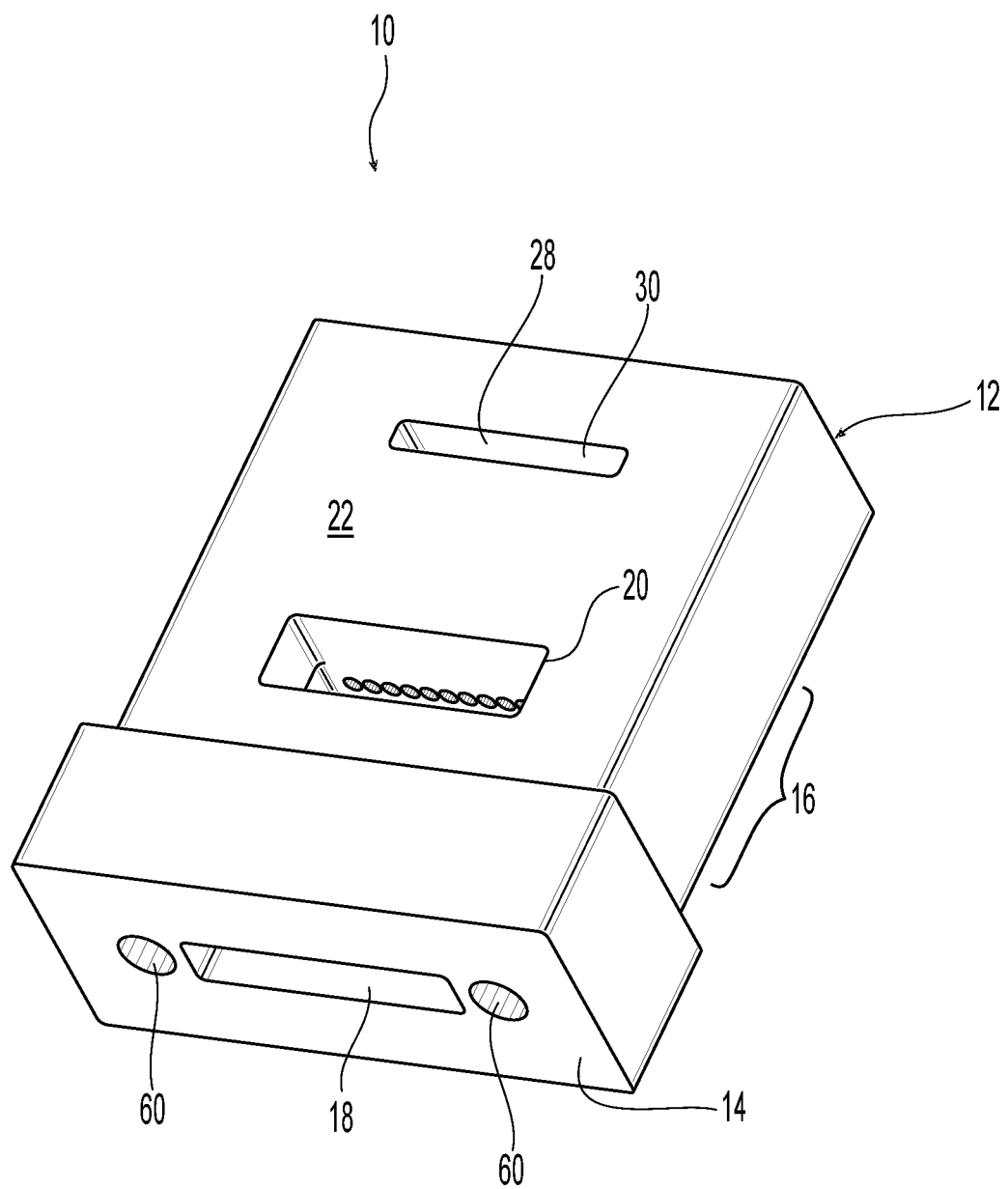
FIG. 1 is a top perspective view of one embodiment of a unitary multi-fiber optical ferrule with integrated lenses according to the present invention.
Figure 2:
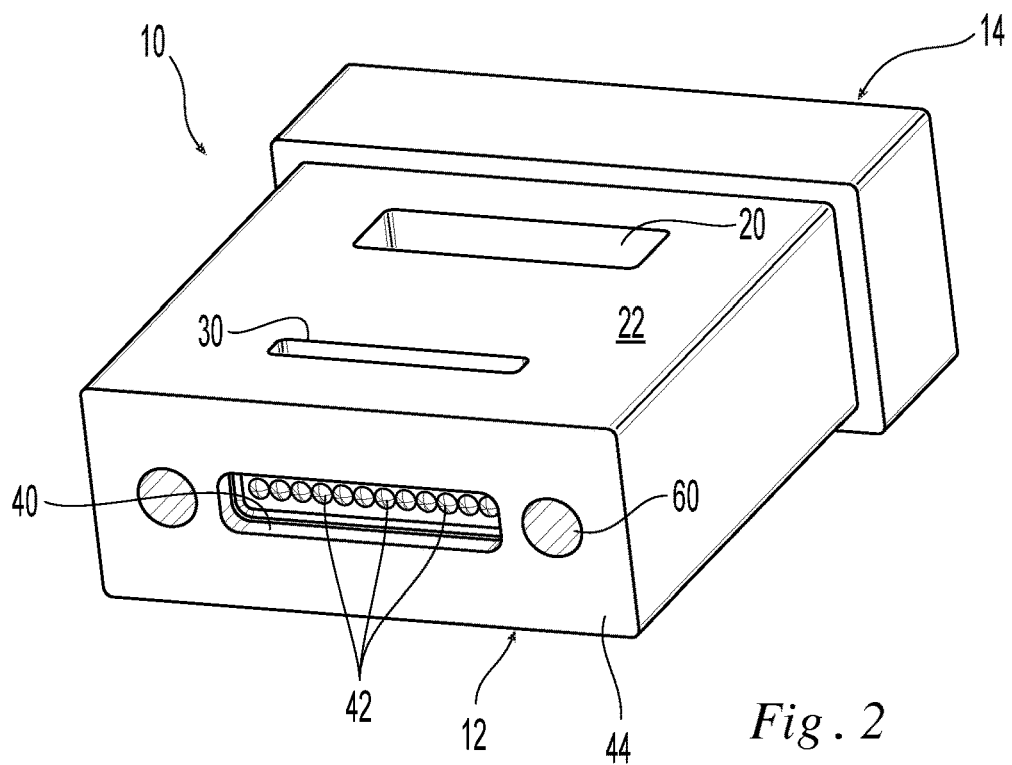
FIG. 2 is a front perspective view of the unitary multi-fiber optical ferrule with integrated lenses of FIG. 1.
Figure 3:
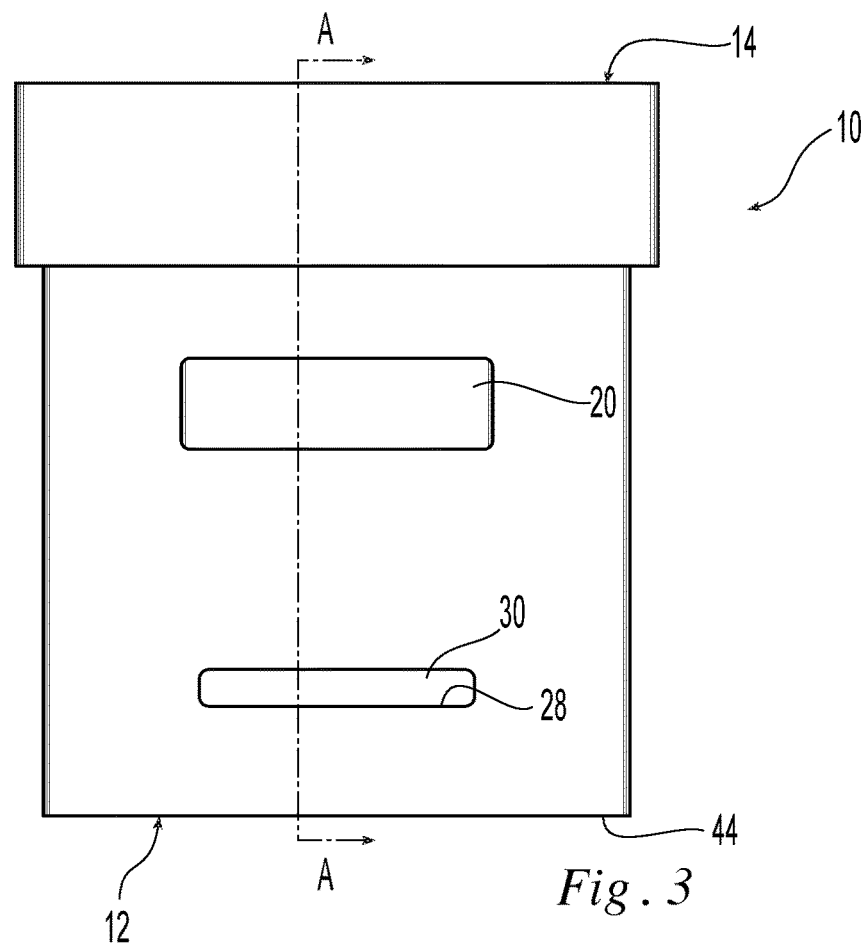
FIG. 3 is a top view of the unitary multi-fiber optical ferrule with integrated lenses of FIG. 1.
Figure 4:
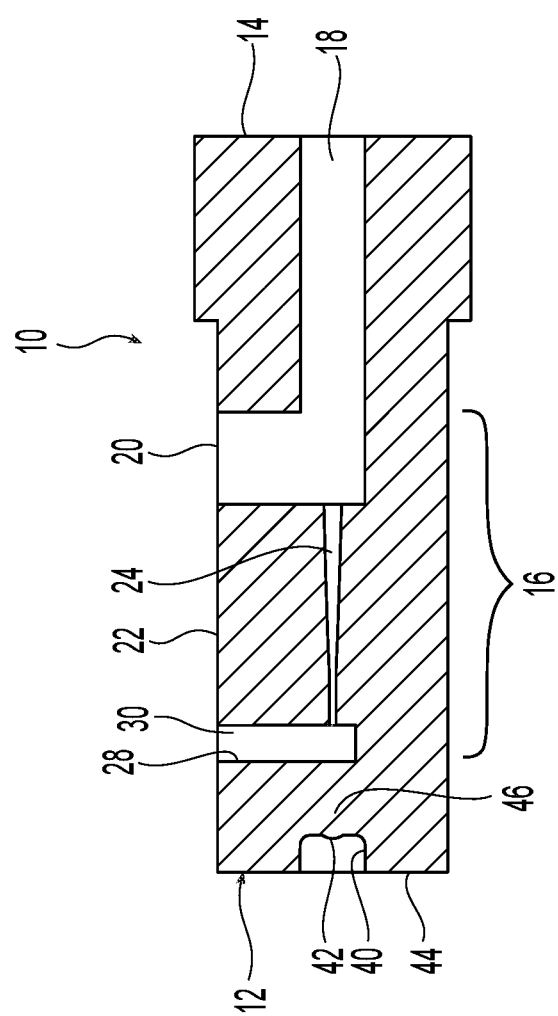
FIG. 4 is a cross-sectional view of the unitary multi-fiber optical ferrule with integrated lenses along the line A-A of FIG. 3.
Figure 5:
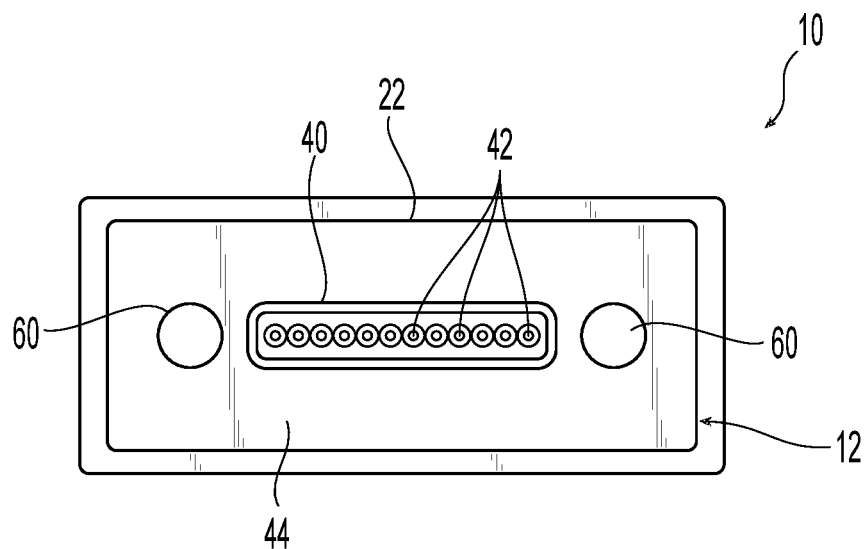
FIG. 5 is a front elevational view of the unitary multi-fiber optical ferrule with integrated lenses of FIG. 1.
Figure 6:
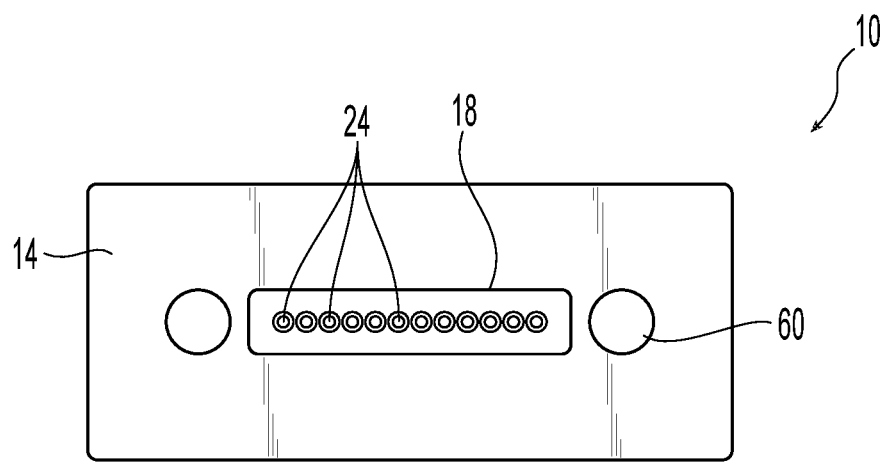
FIG. 6 is a rear elevational view of the unitary multi-fiber optical ferrule with integrated lenses of FIG. 1.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIG. 1, a unitary multi-fiber optical ferrule with integrated lenses 10 (optical ferrule) according to the present invention is illustrated. The optical ferrule 10 preferably has an front end 12, a back end 14, and a middle portion 16 disposed between the front end 12 and the back end 14. The optical ferrule 10 is a unitary ferrule, that is, a single integral element that is preferably molded at the same time from a homogeneous material. The optical ferrule 10 is an optically clear polymer, which may include polyetherimide, polycarbonate, cyclic olefin copolymer, cyclic olefin polymer, or other transparent polymers. The optical ferrule 10 has a first opening 18 adjacent the back end 14 to receive optical fibers therein. The optical ferrule 10 may also have an opening 20 from the top surface 22 of the optical ferrule 10 that is in communication with the first opening 18 to inject epoxy to secure optical fibers within the optical ferrule 10 as described in more detail below. A plurality of micro-holes 24 extend through the middle portion 16 to hold and position optical fibers inserted into the first opening 18. The micro-holes 24 are preferably tapered, being larger adjacent the first opening 18 than at the opposite end. A fiber stop plane 28 is disposed across an opening 30 from the plurality of micro-holes 24. Preferably, the opening 30 opens to one of the sides of the optical ferrule 10, which is the top side 22 in this embodiment of optical ferrule 10. Epoxy may also be injected into the opening 30 to further secure the optical fibers in the optical ferrule 10. Preferably, the epoxy used in the opening 30 and the first opening 18 is an index-matched epoxy that is also preferably light curable. The fiber stop plane 28 is positioned to be a reference plane for the ends of the optical fibers that extend from the first opening 18 through the plurality of micro-holes 24 and across opening 30.

The front end 12 has a recessed portion 40 with a plurality of lenses 42 visible therein. The plurality of lenses 42 are preferably set back from the front face 44 of the front end 12 and are precisely positioned to be in optical alignment with the plurality of micro-holes 24 (and the optical fibers inserted therein). Preferably, the number of lenses 42 corresponds to and are in individual alignment with the number and position of the micro-holes 24. The plurality of lenses 42 are molded with the rest of the optical ferrule 10 and are generally a collimating-type lens. That is, the lenses 42, because they are in contact with air in the recessed portion 40, are collimating due to the difference in the index of refraction between the polymer and the air and the shape of the lens. The light exiting from the optical fibers inserted into the optical ferrule 10 passes through the portion 46 of the optical ferrule 10 between the fiber stop plane 28 and the lenses 42 and is then collimated into a near-parallel light beam to be received by lenses of an identical, mated optical ferrule, which then focus the received light onto the ends of the optical fibers in that ferrule. It is anticipated that the front end 12 of the optical ferrule 10 makes physical contact with the other optical ferrule using the front faces 44. With the front faces 44 of two opposing optical ferrules 10 making physical contact, the recessed portion 40 of each of the optical ferrules 10 are sealed off from the environment and prevents dust, oil, moisture, or other contaminants from being deposited on the lenses and affecting the properties of the lenses 42. Thus, the optical ferrule 10 is designed for ferrule-to-ferrule contact rather than for fiber-to-fiber contact as with MT ferrules.

Figure 7:
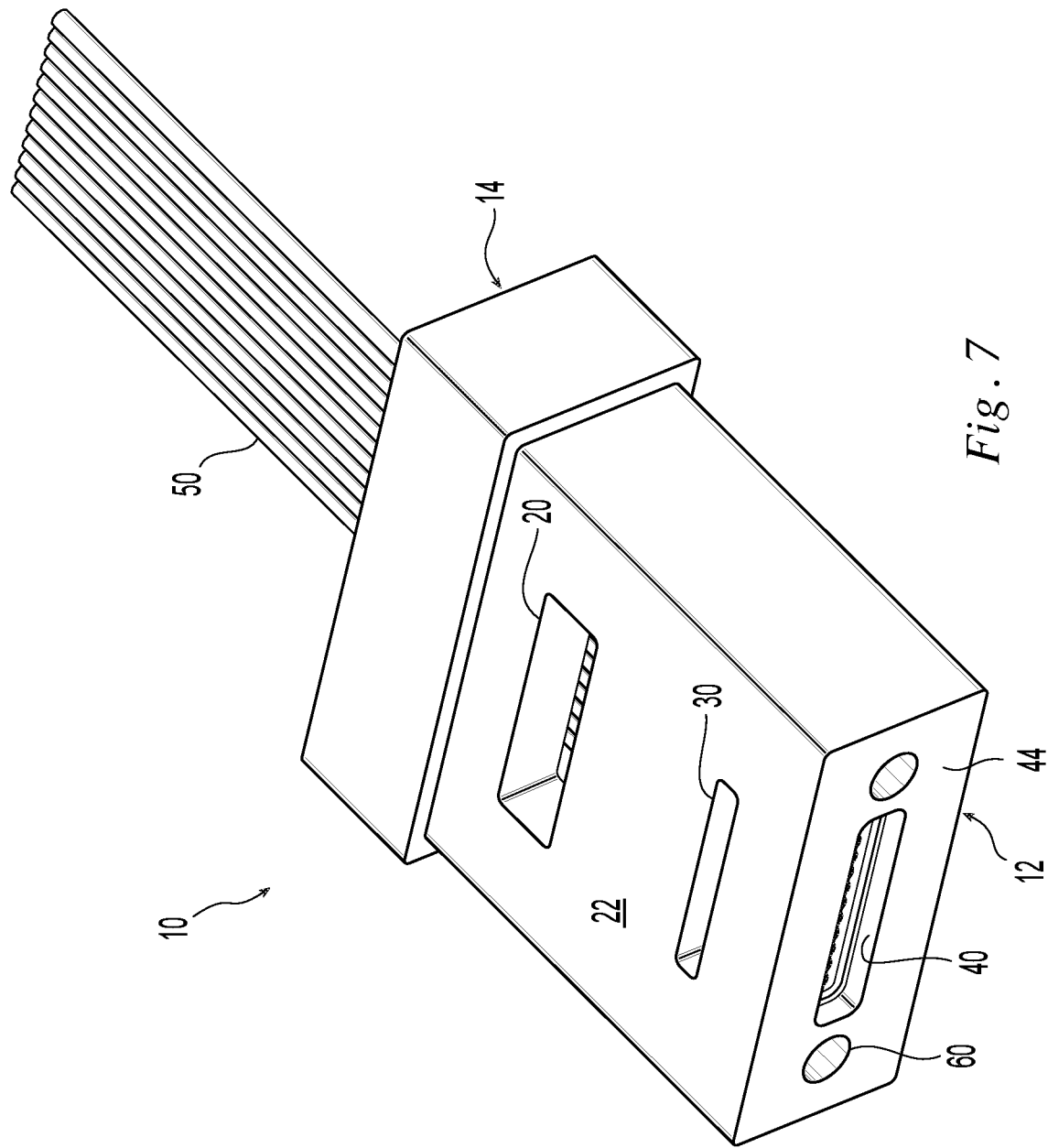
FIG. 7 is a perspective view of the unitary multi-fiber optical ferrule with integrated lenses of FIG. 1 with optical fibers in a ribbon configuration inserted therein.

The optical ferrule 10 may use loose optical fibers that are inserted into the micro-holes 24 or, as illustrated in FIG. 7, the optical fibers may be in the form of an optical ribbon 50. Similarly, loose optical fibers may be bundled rather than be ribbonized before being inserted into the optical ferrule 10.

Referring back to FIGS. 1-6, the optical ferrule 10 also has fiber guide pin openings 60 that extend from the front end 12 to the back end 14. Guide pins as are known in the prior art may be used to align the optical ferrules 10 with one another. It should be noted that while the position and apparent size of the guide pin openings 60 are standard for the industry, the size, location, and/or pitch of the guide pin openings 60 may be altered to prevent the optical ferrule 10 from being mated to a standard ferrule, such as an MT ferrule.

Figure 8:
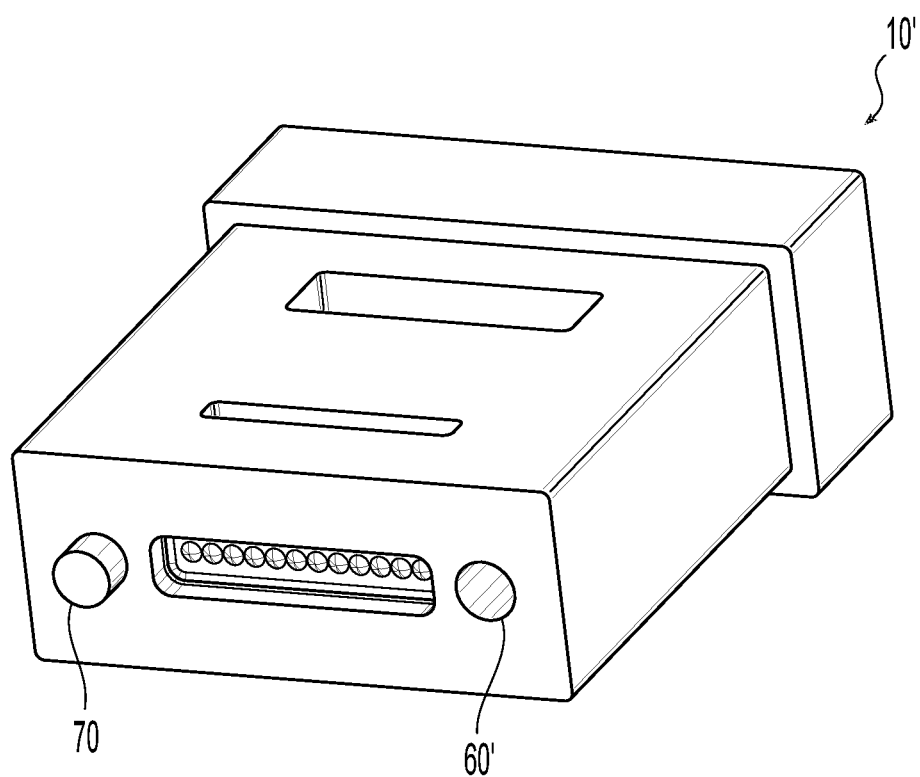
FIG. 8 is a front perspective view of another embodiment of a unitary multi-fiber optical ferrule with integrated lenses according to the present invention.

It is also possible, as is illustrated in FIG. 8 in an alternative embodiment of unitary multi-fiber optical ferrule with integrated lenses 10', that a molded guide pin 70 and a guide pin opening 60' may be used rather than two guide pin openings. By using one integrated, molded guide pin 70 and a guide pin opening 60', making it a hermaphroditic ferrule, only one hermaphroditic ferrule type needs to be manufactured and still allow for mating with the other hermaphroditic ferrules. By using a hermaphroditic ferrule, fiber optic connectors using the optical ferrules 10' are mated key-up to key-up instead of the typical key-up to key-down configuration. By molding the guide pin 70, fewer parts are needed in the assembly, since there is no need for the female pin clamp, the male pin clamp, or the metal guide pins that are commonly used in other optical ferrule formats.

Figure 9:
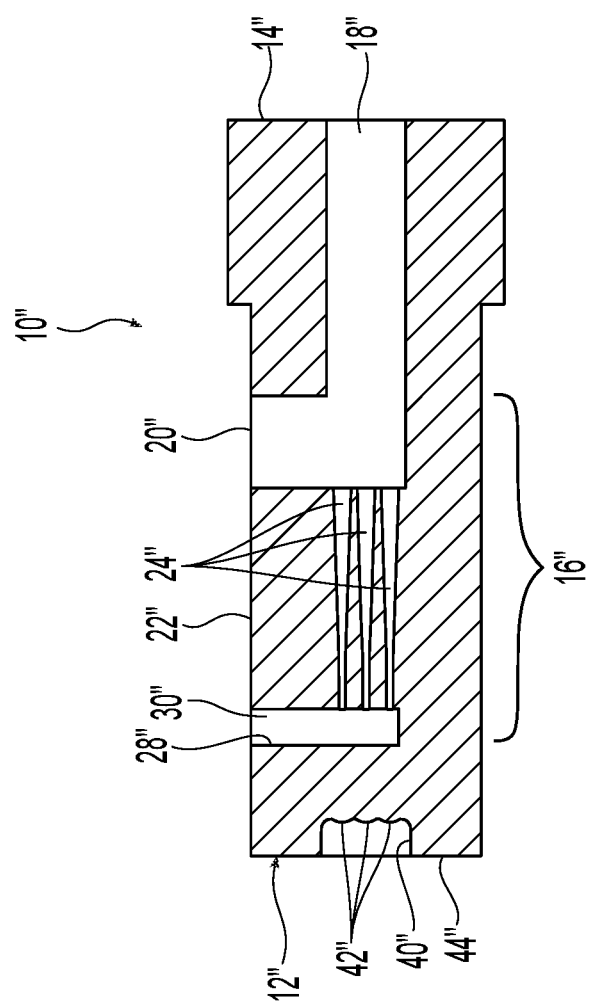
FIG. 9 is a cross-sectional view of another embodiment of a unitary multi-fiber optical ferrule with integrated lenses according to the present invention.

Another alternative embodiment of an unitary multi-fiber optical ferrule with integrated lenses 10" is illustrated in FIG. 9. The optical ferrule 10" preferably has an front end 12", a back end 14", and a middle portion 16" disposed between the front end 12" and the back end 14". The optical ferrule 10" also has a first opening 18" adjacent the back end 14" to receive optical fibers therein. The optical ferrule 10" may also have an opening 20" from the top surface 22" of the optical ferrule 10" that is in communication with the first opening 18" to inject epoxy to secure optical fibers within the optical ferrule 10". The front end 12" has a recessed portion 40" with a plurality of lenses 42". The optical ferrule 10" has a plurality of micro-holes 24", the plurality of micro-holes 24" being divided into a plurality of rows, and a corresponding plurality of lenses 42", the plurality of lenses 42" are divided into a plurality of rows. As noted above, each of the micro-holes 24" being aligned with a respective lens 42". The number of rows of micro-holes 24" and lenses 42" may be determined based on need and application. A fiber stop plane 28" is disposed across an opening 30" from the plurality of micro-holes 24". Preferably, the opening 30 opens to one of the sides of the optical ferrule 10, which is the top side 22" in this embodiment of optical ferrule 10". As illustrated in FIG. 9, three rows of micro-holes 24" and lenses 42" are present for a 36 fiber ferrule.

While the lenses 42 (and 42") have been described as being collimating lenses, they may also be focusing lenses so that the optical ferrules (10, 10', and 10") may be used with a different form of optical ferrule, e.g., a standard MT ferrule. In this case, the lenses 42 (and 42") would focus the light to a point that would correspond to the end of the optical fibers in the other optical ferrules.

The process for inserting optical fibers, such as those in the fiber optic ribbon 50, into the optical ferrules (10, 10', and 10") is as follows. The optical fibers are stripped bare and cleaned. The ends of the optical fibers are cleaved and then inserted into the optical ferrule through the first opening 18 and into the micro-holes 24. The optical fibers are pushed through the micro-holes 24 until they reach the fiber stop plane 28 across the opening 30. An index-matched epoxy is inserted into the openings 20 and 30 to secure the optical fibers in the optical ferrule. The epoxy is light cured (UV and near-UV), which is usually less than one minute in duration. Then an optical test is performed to ensure optical performance. This procedure requires fewer steps and less equipment given that the ends of the optical fibers do not extend through the end face of the optical ferrule as in the MT ferrule discussed above. Additionally, there is no polishing of the end face as noted above for the MT ferrule and time can be reduced using a light-curable epoxy.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A unitary fiber optic ferrule comprising:
   a unitary main body having a front end, a back end, and a middle portion disposed between the front end and back end;
   a single opening into the unitary main body through the back end, the single opening configured to receive a plurality of optical fibers therethrough from the back end of the unitary main body;
   a plurality of optical fiber openings disposed in the middle portion and in communication with and extending away from the single opening toward the front end, each of the plurality of optical fiber openings configured to receive one of the plurality of optical fibers inserted from the back end through the single opening;
   a rear opening through a top surface of the unitary main body and in communication with the single opening and each of the plurality of optical fiber openings to allow access to optical fibers inserted through the single opening and into the plurality of optical fiber openings;
   a forward opening through the top surface of the unitary main body between the rear opening and the front end, the forward opening in communication with the plurality of optical fiber openings;
   a plurality of lenses disposed adjacent the front end of the unitary main body, each of the plurality of lenses being in optical alignment with a respective one of the optical fiber openings, the plurality of lenses having at least one surface exposed to air; and
   a recessed portion directly adjacent the front end of the unitary main body, the front end of the unitary main body terminates in a front face, the front face circumscribing the recessed portion and the plurality of lenses disposed in the recessed portion.

2. The unitary fiber optic ferrule according to claim 1, wherein the unitary main body is molded from an optically clear material.

3. The unitary fiber optic ferrule according to claim 1, wherein the plurality of optical fibers are disposed in an optical fiber ribbon.

4. The unitary fiber optic ferrule according to claim 1, wherein the plurality of optical fibers comprise twelve optical fibers.

5. The unitary fiber optic ferrule according to claim 1, further comprising alignment features, the alignment features being selected from the group including guide pins, holes, and a combination of guide pins and holes.

6. The unitary fiber optic ferrule according to claim 1, wherein the front end of the unitary main body functions as a physical stop for a mating fiber optic ferrule.

7. The unitary fiber optic ferrule according to claim 1, wherein the plurality of optical fiber openings and the plurality of lenses lie in a single plane.

8. The unitary fiber optic ferrule according to claim 1, wherein the plurality of optical fiber openings and the plurality of lenses lie in at least two planes, the at least two planes being generally parallel to one another.

9. The unitary fiber optic ferrule according to claim 1, wherein the unitary main body includes at least one fiber optic guide pin opening extending between the front end and back end to receive a corresponding fiber optic guide pin therein.

10. The unitary fiber optic ferrule according to claim 1, wherein the back end of the unitary main body circumscribes the single opening.

11. The unitary fiber optic ferrule according to claim 1, wherein the forward opening also has a bottom surface and a rear wall, the rear wall opposite a front wall and each of the plurality of optical fiber openings opening into the forward opening through the rear wall and above the bottom surface.

12. The unitary fiber optic ferrule according to claim 1, further comprising an optical fiber stop plane disposed between the plurality of optical fiber openings and the front end.

13. A unitary fiber optic ferrule comprising:
   a unitary main body having a front end, a back end, and a middle portion disposed between the front end and back end;
   a single opening into the unitary main body through the back end, the single opening configured to receive a plurality of optical fibers therethrough from the back end of the unitary main body;
   a plurality of optical fiber openings disposed in the middle portion and in communication with and extending away from the single opening toward the front end, each of the plurality of optical fiber openings configured to receive one of the plurality of optical fibers inserted from the back end through the single opening;
   a rear opening through a top surface of the unitary main body and in communication with the single opening and each of the plurality of optical fiber openings to allow access to optical fibers inserted through the single opening and into the plurality of optical fiber openings;
   a plurality of lenses disposed adjacent the front end of the unitary main body of the unitary fiber optic ferrule, each of the plurality of lenses being in optical alignment with a respective one of the optical fiber openings, the plurality of lenses having at least one surface exposed to air; and
   a recessed portion directly adjacent the front end of the unitary main body, the front end of the unitary main body terminates in a front face, the front face circumscribing the recessed portion and the plurality of lenses disposed in the recessed portion.

14. The unitary fiber optic ferrule according to claim 13, further comprising alignment features, the alignment features being selected from the group including guide pins, holes, and a combination of guide pins and holes.

15. The unitary fiber optic ferrule according to claim 13, wherein the front end of the unitary main body functions as a physical stop for a mating fiber optic ferrule.

16. The unitary fiber optic ferrule according to claim 13, wherein the plurality of optical fiber openings and the plurality of lenses lie in a single plane.

17. The unitary fiber optic ferrule according to claim 13, wherein the plurality of optical fiber openings and the plurality of lenses lie in at least two planes, the at least two planes being generally parallel to one another.

18. The unitary fiber optic ferrule according to claim 13, wherein the back end of the unitary main body circumscribes the single opening.

19. The unitary fiber optic ferrule according to claim 13, further comprising a forward opening through the top surface of the unitary main body between the rear opening and the front end, wherein the forward opening also has a bottom surface and a rear wall, the rear wall opposite a front wall and each of the plurality of optical fiber openings opening into the forward opening through the rear wall and above the bottom surface.

20. A unitary fiber optic ferrule comprising:
a unitary main body having a front end, a back end, and a middle portion disposed between the front end and back end;
a single opening into the unitary main body through the back end, the single opening configured to receive a plurality of optical fibers therethrough from the back end of the unitary main body;
a plurality of optical fiber openings disposed in the middle portion and in communication with and extending away from the single opening toward the front end, each of the plurality of optical fiber openings configured to receive one of the plurality of optical fibers inserted from the back end through the single opening;
a rear opening through a top surface of the unitary main body and in communication with the single opening and each of the plurality of optical fiber openings to allow access to optical fibers inserted through the single opening and into the plurality of optical fiber openings;
a forward opening through the top surface of the unitary main body between the rear opening and the front end, the forward opening in communication with the plurality of optical fiber openings;
a plurality of lenses disposed adjacent the front end of the unitary main body, each of the plurality of lenses being in optical alignment with a respective one of the optical fiber openings; and
a recessed portion directly adjacent the front end of the unitary main body, the front end of the unitary main body terminates in a front face, the front face circumscribing at least a portion of the recessed portion and the plurality of lenses disposed in the recessed portion.

* * * * *